(12) United States Patent
Perkinson

(10) Patent No.: US 8,790,087 B2
(45) Date of Patent: Jul. 29, 2014

(54) INTERLOCKING BLADE SHEATH

(75) Inventor: Robert H. Perkinson, Stonington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 555 days.

(21) Appl. No.: 13/096,204

(22) Filed: Apr. 28, 2011

(65) Prior Publication Data

US 2012/0275924 A1 Nov. 1, 2012

(51) Int. Cl.
*F01D 5/28* (2006.01)
(52) U.S. Cl.
USPC .......................................................... 416/224
(58) Field of Classification Search
USPC .................. 416/224, 226; 29/889.7
See application file for complete search history.

(56) References Cited

U.S. PATENT DOCUMENTS

| 5,222,297 A | 6/1993 | Graff et al. |
| 5,881,972 A | 3/1999 | Smith et al. |
| 2010/0104461 A1 | 4/2010 | Smith et al. |

FOREIGN PATENT DOCUMENTS

WO WO9907981 A1 2/1999

*Primary Examiner* — Dwayne J White
(74) *Attorney, Agent, or Firm* — Cantor Colburn LLP

(57) ABSTRACT

A blade assembly includes a blade body and at least one sheath assembly located at a leading edge of the blade assembly. The at least one sheath assembly is retained to the blade body in a chordwise direction via an interlocking arrangement between the at least one sheath assembly and the blade body. A tip cap is located at a tip portion of the blade and secured to the blade body thus securing the at least one sheath assembly to the blade body in a spanwise direction. A method of assembling an airfoil includes securing at least one sheath assembly to a leading edge of a blade body via an interlocking arrangement between the at least one sheath assembly and the blade body, and assembling a tip cap to the blade body, thereby retaining the at least one sheath assembly to the blade body in a spanwise direction.

17 Claims, 2 Drawing Sheets

INTERLOCKING BLADE SHEATH

BACKGROUND OF THE INVENTION

The subject matter disclosed herein relates to airfoils. More specifically, the subject disclosure relates to airfoils utilized in aircraft engines and propeller-driven craft, including aircraft and land/watercraft.

In an effort to decrease weight of parts having an airfoil shape, such as aircraft engine fan blades, exit guide vanes, propeller blades for aircraft and land/watercraft, and certain structural support members located in airstreams, the use of composite components, such as graphite fiber reinforcements with an epoxy matrix, in such parts has increased. Parts having composite components at their edges (e.g., leading edges, trailing edges, and tips) do not exhibit adequate strength or hardness to protect themselves from erosion and foreign object damage, and especially from damage as a result of impact with birds, ice, stones, sand, rain and other debris. Accordingly, protective sheaths are often used to protect the parts.

The typical sheath, however, is permanently affixed to the part, and therefore the service life of the part is limited by the life of the sheath. In the event of erosion of, or damage to the sheath, the part must be replaced.

BRIEF DESCRIPTION OF THE INVENTION

According to one aspect of the invention, a blade assembly includes a blade body and at least one sheath assembly located at a leading edge of the blade assembly. The at least one sheath assembly is retained to the blade body in a chordwise direction via an interlocking arrangement between the at least one sheath assembly and the blade body. A tip cap is located at a tip portion of the blade and secured to the blade body thus securing the at least one sheath assembly to the blade body in a spanwise direction.

According to another aspect of the invention, a blade protector assembly includes at least one sheath assembly securable to a blade body of a blade and retained thereto in a chordwise direction via an interlocking arrangement between the at least one sheath assembly and the blade body. The assembly further includes a tip cap located at a tip portion of the blade and securable to the blade body thus securing the at least one sheath assembly to the blade body in a spanwise direction.

According to yet another aspect of the invention, a method of assembling an airfoil includes securing at least one sheath assembly to a leading edge of a blade body via an interlocking arrangement between the at least one sheath assembly and the blade body, and securing a tip cap to the blade body, thereby retaining the at least one sheath assembly to the blade body in a spanwise direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
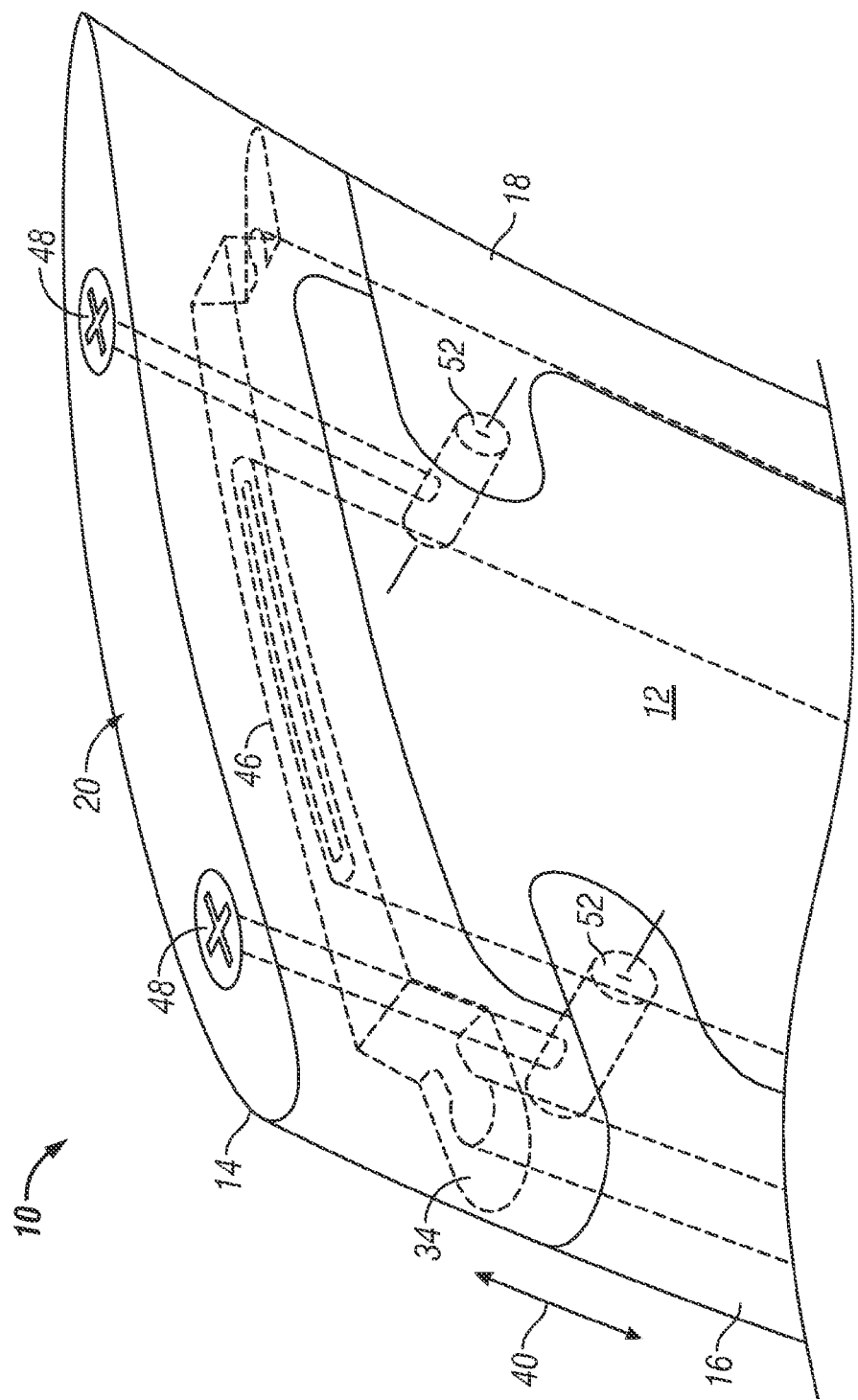
FIG. 1 is a partial perspective view of an embodiment of a blade.

Shown in FIG. 1 is an embodiment of a blade 10. Although the term "blade" is utilized throughout the present disclosure, it is to be appreciated that the blade may be any airfoil shaped part of an aircraft or land/watercraft including, but not limited to, aircraft engine fan blades, exit guide vanes, propellers for aircraft and land/watercraft, and certain structural support members located in airstreams. The blade 10 includes a blade body 12 with an interlocking, replaceable blade protector 14 affixed thereto. The illustrated blade protector 14 includes a leading edge sheath assembly 16, a trailing edge sheath assembly 18 and a tip cap 20.

Figure 2:
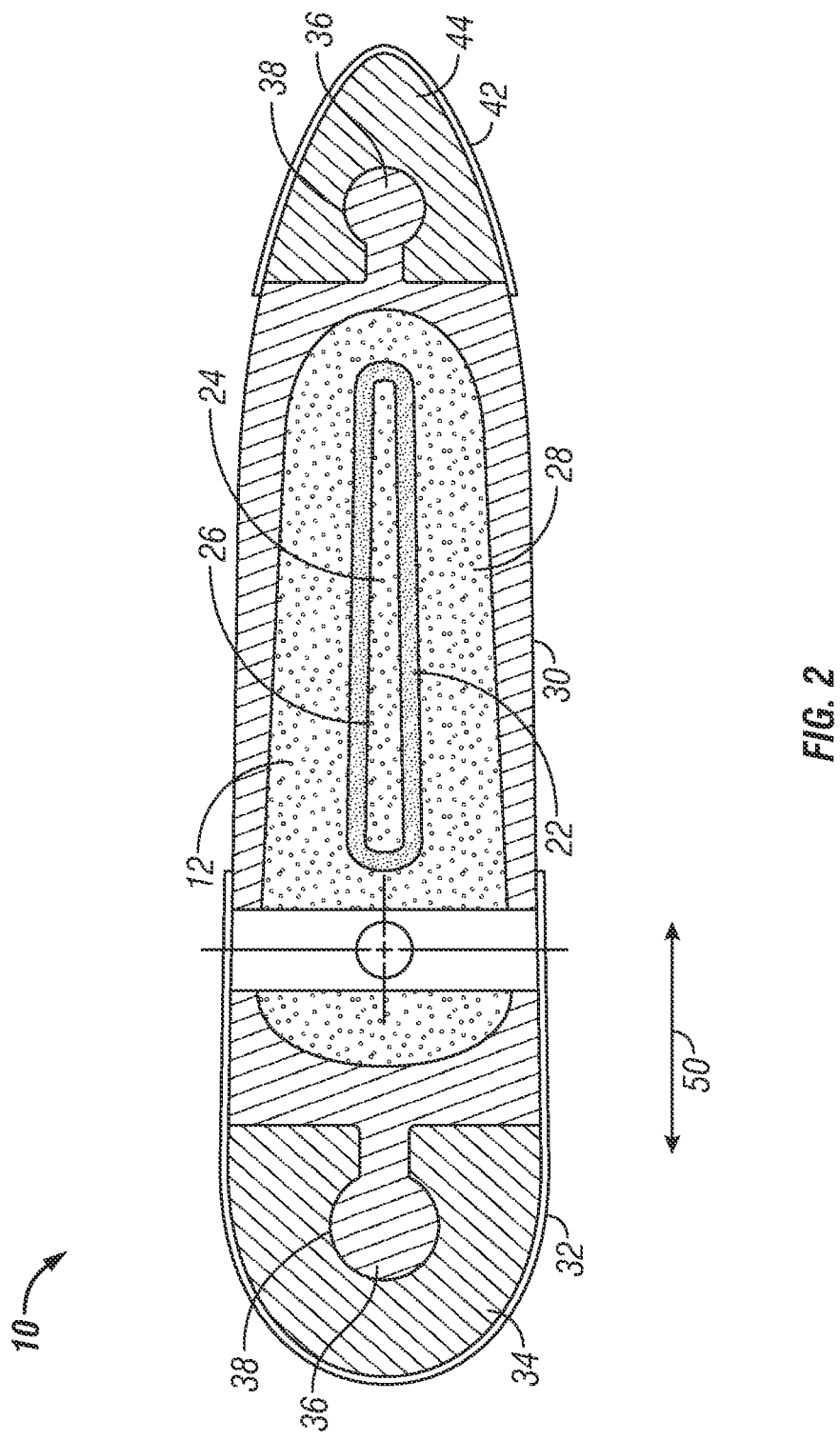
FIG. 2 is a partial cross-sectional view of an embodiment of a blade.

Referring now to FIG. 2, in some embodiments the blade body 12 is a composite structure including a structural spar 22, which may be a carbon or graphite material, extending along a length of the blade body 12. A spar core 24, which may be a lightweight foam material is located inside a spar cavity 26. Further a body core 28 may be disposed outside of the spar 22. The body core 28 and spar 22 are at least partially enclosed in a blade shell 30, which is formed from a nonmetallic material such as a fiberglass or graphite composite.

The leading edge sheath assembly 16 includes a leading edge sheath 32 affixed to a nose piece 34, by for example, an adhesive bond. The leading edge sheath 32 material is selected to provide erosion and impact resistance to the blade 10. For example, the leading edge sheath 32 can be formed from a metallic material such as a nickel, cobalt, or nickel-cobalt alloy, and is shaped to conform to a selected leading edge shape of the blade 10. The leading edge sheath assembly 16 is assembled to the blade body 12 via an interlocking arrangement between a tab 36 located at the blade shell 30 and a slot 38 located at the nose piece 34 which retains the leading edge sheath assembly 16 to the blade body 12 in a chordwise direction 50. It is to be appreciated, however, that this configuration could be reversed, with the tab 36 located at the nose piece 34 and the slot 38 located at the blade shell 30.

A similar arrangement is shown regarding the trailing edge sheath assembly 18. The trailing edge sheath assembly 18 includes a trailing edge sheath 42 affixed to a tail piece 44 which interlocks with the blade shell 30 via a tab 36 and slot 38 arrangement.

To install the leading edge sheath assembly 16 to the blade body, the tab 36 and slot 38 are aligned and the nose piece 34 is moved along the blade body 12 in a spanwise direction 40 (shown in FIG. 1), thus fully interlocking the nose piece 34 with the blade body 12.

Referring again to FIG. 1, after the leading edge sheath assembly 16 and trailing edge sheath assembly 18 are assembled to the blade body 12, the tip cap 20 is installed at a blade body tip 46. In some embodiments, the tip cap 20 may be installed by sliding, utilizing a tab and slot arrangement similar to that used for installation of the sheath assemblies 16, 18. In some embodiments, the tip cap is metallic, and may be formed of a nickel, cobalt, or nickel-cobalt alloy. The installation of the tip cap 20 secures the leading edge sheath assembly 16 and trailing edge sheath assembly 18 in the spanwise direction. In some embodiments, the tip cap 20 is secured to the blade body 12 via one or more barrel bolts 48. The barrel bolts 48 are threaded and extend through one or more barrel nuts 52 located transversely in the blade body 12.

In some embodiments, as shown best in FIG. 2, the barrel nuts 52 extend through the blade body 12 and are trapped in place by the leading edge sheath 32 and/or trailing edge sheath 42 extending over the barrel nut 52.

With this configuration, the leading edge sheath assembly 16, trailing edge sheath assembly 18 and tip cap 20 are all easily removable from the blade body 12 and replaceable, thus extending the service life of the blade body 12 and reducing repair costs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A blade assembly comprising:
   a blade body;
   at least one sheath assembly disposed at a leading edge of the blade assembly, the at least one sheath assembly retained to the blade body in a chordwise direction via an interlocking arrangement between the at least one sheath assembly and the blade body, the at least one sheath assembly including:
      a support piece; and
      a metallic sheath bonded to the support piece; and
   a tip cap disposed at a tip portion of the blade and secured to the blade body thus securing the at least one sheath assembly to the blade body in a spanwise direction.

2. The blade assembly of claim 1, further comprising at least one sheath assembly disposed at a trailing edge of the blade assembly.

3. The blade assembly of claim 1, wherein the interlocking arrangement comprises:
   a slot in one of the sheath assembly or the blade body; and
   a tab in the other of the sheath assembly or the blade body receivable in the slot.

4. The blade assembly of claim 1, wherein the metallic sheath substantially conforms to a selected airfoil shape.

5. The blade assembly of claim 1, wherein the tip cap is secured to the blade body via one or more mechanical fasteners extending into the blade body.

6. The blade assembly of claim 5, wherein the one or more mechanical fasteners comprises one or more barrel bolts which thread into one or more barrel nuts disposed transversely in the blade body.

7. A blade protector assembly comprising:
   at least one sheath assembly securable to a blade body of a blade retained thereto in a chordwise direction via an interlocking arrangement between the at least one sheath assembly and the blade body, the at least one sheath assembly including:
      a support piece; and
      a metallic sheath bonded to the support piece; and
   a tip cap disposed at a tip portion of the blade and securable to the blade body thus securing the at least one sheath assembly to the blade body in a spanwise direction.

8. The blade protector of claim 7, wherein the at least one sheath assembly is securable to the blade body at a leading edge of the blade.

9. The blade protector of claim 7, further comprising at least one sheath assembly securable at a trailing edge of the blade.

10. The blade protector of claim 7, wherein the interlocking arrangement comprises:
   a slot in one of the sheath assembly or the blade body; and
   a tab in the other of the sheath assembly or the blade body receivable in the slot.

11. The blade protector of claim 7, wherein the metallic sheath substantially conforms to a selected airfoil shape.

12. The blade protector of claim 7, wherein the tip cap is secured to the blade body via one or more mechanical fasteners extending into the blade body.

13. The blade protector of claim 12, wherein the one or more mechanical fasteners comprises one or more barrel bolts which thread into one or more barrel nuts disposed transversely in the blade body.

14. A method of assembling an airfoil comprising:
   securing at least one sheath assembly to a leading edge of a blade body via an interlocking arrangement between the at least one sheath assembly and the blade body, the at least one sheath assembly including:
      a support piece; and
      a metallic sheath bonded to the support piece; and
   securing a tip cap to the blade body, thereby retaining the at least one sheath assembly to the blade body in a spanwise direction.

15. The method of claim 14, further comprising assembling at least one sheath assembly to a trailing edge of a blade body via an interlocking arrangement between the at least one sheath assembly and the blade body.

16. The method of claim 14, wherein securing the at least one sheath assembly to the blade body comprises:
   aligning a slot in one of the sheath assembly or the blade body with a tab in the other of the sheath assembly or the blade body; and
   sliding the at least one sheath assembly in a spanwise direction to interlock the at least one sheath assembly and the blade body.

17. The method of claim 14, wherein securing the tip cap to the blade body comprises threading one or more barrel bolts extending through the tip cap into one or more barrel nuts disposed transversely in the blade body.

* * * * *